US009975137B2

(12) United States Patent
Trend et al.

(10) Patent No.: US 9,975,137 B2
(45) Date of Patent: May 22, 2018

(54) SYSTEMS AND METHODS FOR SEALANT LAYERING (71) Applicant: The Boeing Company, Chicago, IL (US)

(72) Inventors: Don David Trend, Huntington Beach, CA (US); Jake Boyce Weinmann, Signal Hill, CA (US); Frederick B. Frontiera, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 320 days.

(21) Appl. No.: 14/667,634

(22) Filed: Mar. 24, 2015

(65) Prior Publication Data
US 2016/0279863 A1    Sep. 29, 2016

(51) Int. Cl.
*B05C 9/06* (2006.01)
*B05C 5/02* (2006.01)
*B64F 5/00* (2017.01)

(52) U.S. Cl.
CPC .............. *B05C 9/06* (2013.01); *B05C 5/0216* (2013.01); *B64F 5/00* (2013.01)

(58) Field of Classification Search
CPC ................................. F16B 19/008; B05C 9/06
USPC ................... 427/407.1, 410, 413, 208.8, 284
See application file for complete search history.

(56) References Cited

U.S. PATENT DOCUMENTS

| | | | |
|---|---|---|---|
| 4,033,621 A * | 7/1977 | Rogers | B60J 7/1657 296/176 |
| 4,778,642 A | 10/1988 | Lee et al. | |
| 4,964,362 A | 10/1990 | Dominguez | |
| 5,908,644 A | 6/1999 | Poole | |
| 6,001,181 A | 12/1999 | Bullen | |
| 7,963,246 B1 | 6/2011 | Brinker | |
| 8,651,046 B1 | 2/2014 | Davancens et al. | |
| 9,016,530 B2 | 4/2015 | Topf et al. | |
| 2004/0166333 A1 * | 8/2004 | Byrd | C08G 18/61 428/447 |
| 2008/0128430 A1 | 6/2008 | Kovach et al. | |

(Continued)

FOREIGN PATENT DOCUMENTS

| | | |
|---|---|---|
| DE | 951478 C | 10/1956 |
| DE | 202008003757 U1 | 9/2009 |

(Continued)

OTHER PUBLICATIONS

European Patent Office, Office Action Communication Pursuant to Article 94(3) EPC in European Patent Application No. 16 162 094.3-1760, dated Mar. 27, 2017, 4 pages.
European Patent Office, Extended European Search Report in European Patent Application No. 16162094.3-1760, dated Aug. 10, 2016, 6 pages.

(Continued)

*Primary Examiner* — Scott W Dodds
(74) *Attorney, Agent, or Firm* — Kolisch Hartwell, P.C.

(57) ABSTRACT

Systems and methods for applying sealant to a seam between a first work piece and a second work piece, including applying a fillet layer of the sealant to cover the seam, applying a first flaring layer of the sealant adjacent the fillet layer and contacting the fillet layer and the first work piece, applying a second flaring layer of the sealant that contacts the second work piece, and applying at least one filling layer of the sealant so that the filling layers of the sealant in combination contact each of the first flaring layer, the fillet layer, and the second flaring layer.

16 Claims, 7 Drawing Sheets

(56) References Cited

U.S. PATENT DOCUMENTS

| | | | | |
|---|---|---|---|---|
| 2010/0107513 | A1* | 5/2010 | Buchanan | B64C 3/18 |
| | | | | 52/84 |
| 2010/0264274 | A1* | 10/2010 | Bradley | B32B 3/26 |
| | | | | 244/135 R |
| 2012/0183784 | A1* | 7/2012 | Russell | C09D 7/1216 |
| | | | | 428/424.2 |
| 2013/0207348 | A1 | 8/2013 | Smeets | |
| 2014/0209736 | A1* | 7/2014 | Nishimura | B64D 45/02 |
| | | | | 244/1 A |

FOREIGN PATENT DOCUMENTS

| | | |
|---|---|---|
| EP | 0889108 A1 | 1/1999 |
| EP | 2837430 A2 | 2/2015 |
| GB | 2524508 A | 9/2015 |
| WO | 0226397 A1 | 4/2002 |
| WO | 2012084238 A1 | 6/2012 |
| WO | 2014063806 A1 | 5/2014 |
| WO | 2014179015 A1 | 11/2014 |

OTHER PUBLICATIONS

U.K. Intellectual Property Office, Combined Search and Examination Report under Sections 17 and 18(3) UK Patent Application No. GB1609279.3, dated Nov. 10, 2016, 6 pages.

* cited by examiner

SYSTEMS AND METHODS FOR SEALANT LAYERING

FIELD

This disclosure relates to manufacturing methods. More specifically, the disclosed embodiments relate to methods and systems for applying sealant to seams between adjacent work pieces.

BACKGROUND

Many types of manufacturing require that an airtight and/or watertight seal be created between adjacent work pieces, often resulting in the manual application of a sealant, followed by a manual reshaping of the applied sealant to achieve a desired sealant profile.

While seal quality is a concern, in many applications it may be additionally desirable to minimize the amount of sealant used, while still insuring that the resulting sealant profile is smooth enough to minimize turbulence that may occur when a fluid passes over the sealant.

While the application of sealant may have utility in a broad variety of applications, the use of sealant in aerospace manufacturing may be of particularly importance, for example in minimizing added weight, and streamlining the resulting sealant profile.

SUMMARY

The present disclosure provides systems and methods for the application of a sealant to a seam between a first work piece and a second work piece.

In some embodiments, the disclosure provides a method of applying a sealant to a seam between a first work piece and a second work piece that abuts the first work piece that includes applying a fillet layer of the sealant to the first and second work pieces so that the fillet layer covers the seam, applying a first flaring layer of the sealant adjacent to the fillet layer so that the first flaring layer contacts the fillet layer and the first work piece, applying a second flaring layer of the sealant so that the second flaring layer contacts the second work piece, and applying at least one filling layer of sealant so that the one or more filling layers, in combination, contact each of the first flaring layer, the fillet layer, and the second flaring layer.

In some embodiments, the disclosure provides a method of applying sealant to a first work piece disposed on a second work piece that includes applying a fillet layer of sealant to the first and second work pieces so that the fillet layer covers the seam between the first work piece and the second work piece, applying a first flaring layer of sealant adjacent to the fillet layer that contacts both the fillet layer and the first work piece, and applying a third layer of sealant that contacts both the previously applied sealant and the second work piece.

In some embodiments, the disclosure provides a system for applying sealant to a first work piece and a second work piece that includes a robotic assembly having a nozzle configured to apply sealant to the seam formed between first and second work pieces, and a computer connected to the robotic assembly and programmed to control operation of the robotic assembly to deliver sequentially through the nozzle: (a) a first fillet layer of sealant covering the seam between the first work piece and the second work piece, (b) a first flaring layer of sealant contacting the first work piece and the first fillet layer, and (c) a third layer of sealant contacting previously applied sealant and the second work piece.

The features, functions, and advantages may be achieved independently in various embodiments of the present disclosure, or may be combined in yet other embodiments, further details of which can be seen with reference to the following description and drawings.

DESCRIPTION

Overview

Various embodiments of systems and methods for sealant layering are described below and illustrated in the associated drawings. Unless otherwise specified, the systems and/or its various constituents may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other manufacturing environments, for use on any of a variety of structures. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Specific Examples, Major Components, and Alternatives

The following examples describe methods for the application of layered sealant to a seam between first and second work pieces. These examples may include descriptions of the methods of applying the layered sealant to such a seam, as well as descriptions of systems that may be used to apply the sealant to such a seam. These specific examples are intended for illustration and should not be interpreted as limiting the entire scope of the present disclosure. Each example may include one or more distinct disclosures, and/or contextual or related information, function, and/or structure.

Example 1

Figure 1:
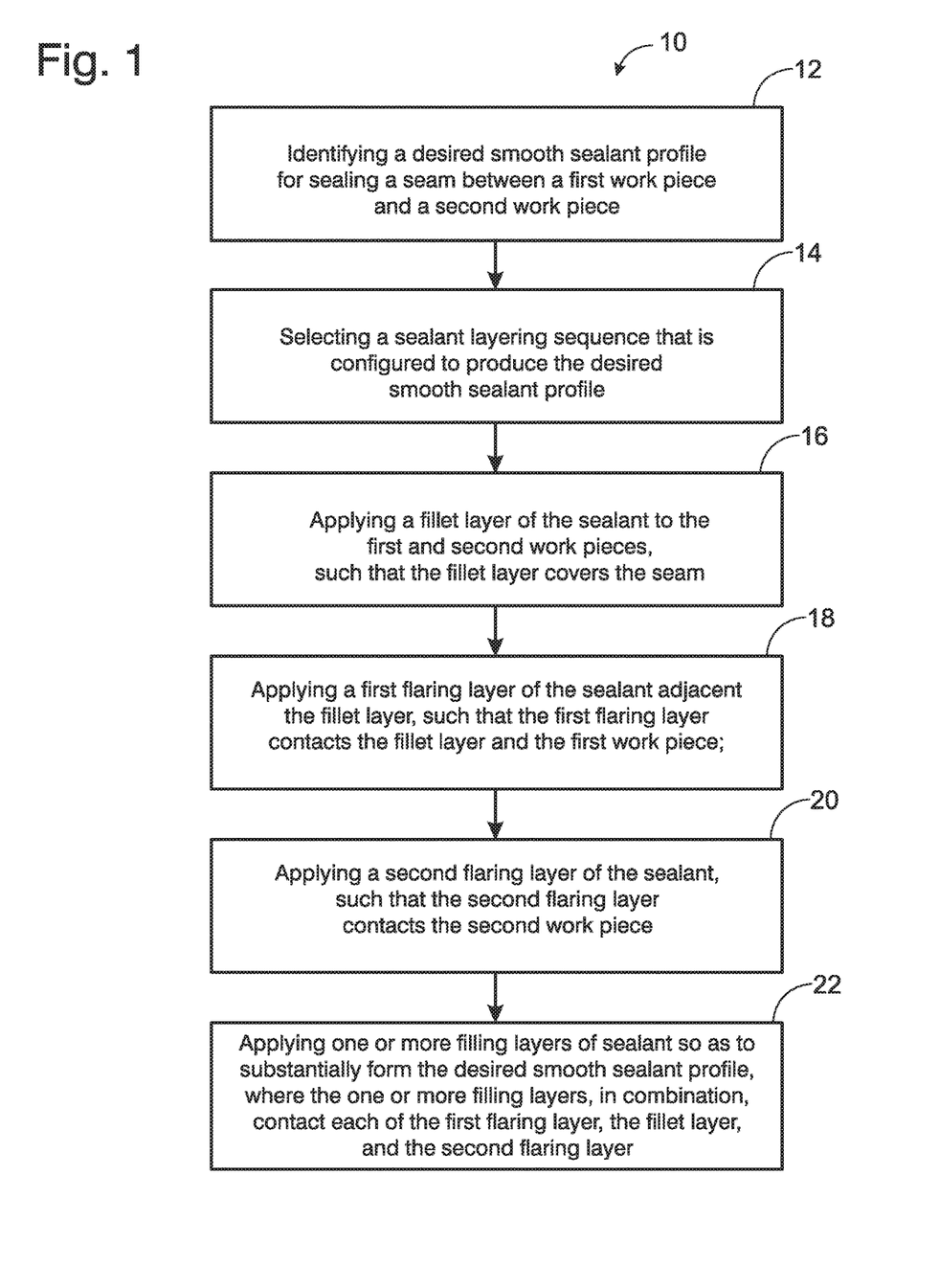
FIG. 1 is a flowchart depicting an illustrative method of applying sealant to a first and second work pieces.

An illustrative method of applying layered sealant to a seam between a first work piece and a second work piece abutting the first work piece is depicted by flowchart 10 of FIG. 1. As depicted, the illustrative method includes identifying a desired smooth sealant profile for sealing a seam between a first work piece and a second work piece (at 12 of flowchart 10), selecting a sealant layering sequence that is configured to produce the desired smooth sealant profile (at 14 of flowchart 10); applying a fillet layer of the sealant to the first and second work pieces, such that the fillet layer covers the seam (at 16 of flowchart 10); applying a first flaring layer of the sealant adjacent the fillet layer, such that the first flaring layer contacts the fillet layer and the first work piece (at 18 of flowchart 10); applying a second flaring layer of the sealant, such that the second flaring layer contacts the second work piece (at 20 of flowchart 10); and applying one or more filling layers of sealant so as to substantially form the desired smooth sealant profile, where the one or more filling layers in combination contact each of the first flaring layer, the fillet layer, and the second flaring layer (at 22 of flowchart 10).

The first work piece and second work piece may comprise any materials that are physically and/or chemically compatible, including metals and metal alloys, plastics, composite materials, glass, tile, stone, and the like. Similarly, the sealant composition may be any material that has a suitable viscosity under the desired application conditions to remain sufficiently liquid to be applied while still remaining viscous enough to substantially retain its form after being applied. The sealant composition will typically have adhesive properties in order to provide an effective seal, and may additionally be capable of curing, either via the addition of a catalyst, heating, illumination with light of an appropriate wavelength, or simply with the passage of time.

A variety of sealant compositions are commercially available, including metals, plastic sealants, rubber sealants, and varnishes, among many others. In one embodiment of the disclosure, the sealant composition is a polysulfide-based synthetic rubber sealant.

Flowchart 10 should not be considered to be the only or exclusive method of applying layered sealant for the purposes of the present disclosure. It should be appreciated that the respective layers of sealant may be applied, but are not necessarily required to be applied, in the order shown in Flowchart 10. The layers of sealant may be applied discretely, that is individually and one at a time. Alternatively or in addition, the sealant layers may be applied in a continuous process without stopping the flow of sealant or lifting the nozzle, or some combination thereof. The disclosed method may be used to seal seams that are linear, that comprise linear segments, curvilinear, or any combination thereof. In one aspect, the fillet layer and the first flaring layer may be combined in a single layer of sealant.

Figure 2:
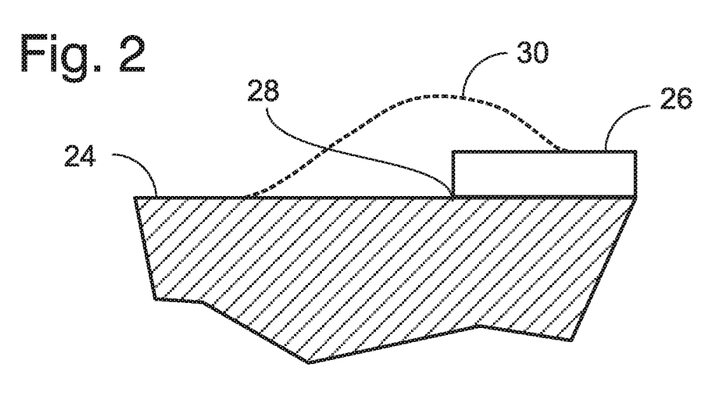
FIG. 2 is a diagrammatic representation of a cross-sectional view of first and second work pieces and a desired sealant profile.

An exemplary sequence of events corresponding to a method of flowchart 10 are shown in FIGS. 2-7. FIG. 2 depicts a first work piece 24 upon which is disposed a second work piece 26, thereby forming a seam 28 where the two work pieces abut one another. The method of flowchart 10 may be particularly suitable for the application of sealant so as to create a substantially continuous and smooth seal. That is, a seal made according to the method of flowchart 10 may possess a cross-sectional profile that offers few or no discontinuities, lips, or edges that may disrupt fluid flowing over the surface. Profile 30 of FIG. 2 therefore represents a calculated, or desired, profile for the sealant to be applied to seam 28.

FIG. 2 depicts a second work piece resting upon a first work piece. Seam 28 is therefore disposed at the vertex of an approximate right angle defined by the first and second work pieces. It should be appreciated that the shape and disposition of the first and second work pieces may vary, and the resulting seam may be disposed at the vertex of any resulting angle between the first and second work pieces. The seam may be disposed at the vertex of an angle that is less than 90 degrees, approximately 90 degrees, greater than 90 degrees, between 90 degrees and 180 degrees, approximately 180 degrees, or greater than 180 degrees. In an exemplary embodiment, the first and second work pieces abut to define an angle that is approximately a right angle, as shown in FIGS. 2-7.

Figure 3:
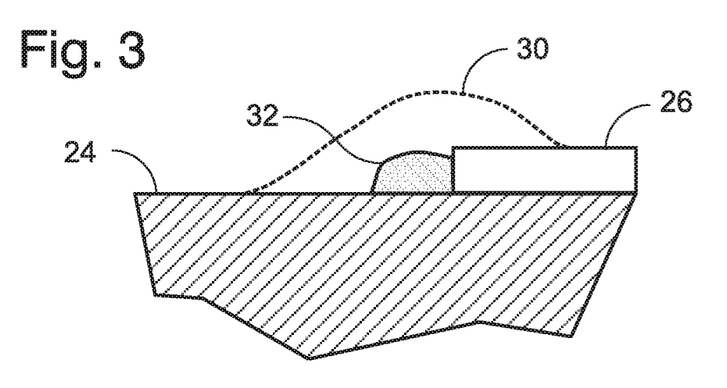
FIG. 3 is a diagrammatic representation of a cross-sectional view of the work pieces of FIG. 2, including a fillet layer of sealant.

FIG. 3 depicts fillet layer 32 (or bead) of sealant applied to the first and second work pieces so that the fillet layer covers the seam 28. Typically, the sealant is extruded from the tip of a sealant dispenser nozzle. As shown, fillet layer 32 provides good insertion of the sealant composition from the dispenser nozzle and into seam 28. As the sealant composition is dispensed from the dispenser nozzle tip, the sealant typically spreads somewhat upon contacting the surface of the work piece. That is, sealant is urged outwardly along the surface from the nozzle tip.

Figure 4:
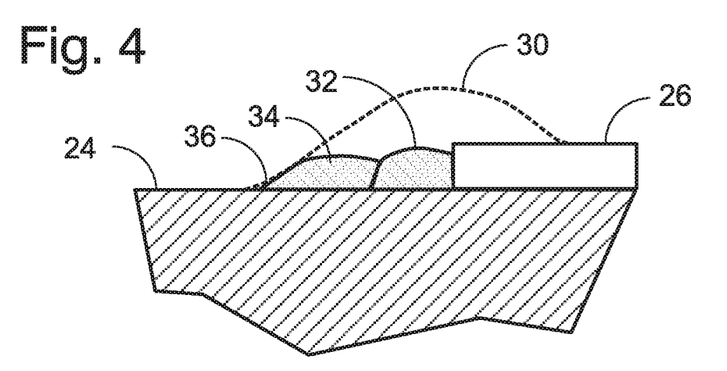
FIG. 4 is a diagrammatic representation of a cross-sectional view of the work pieces of FIG. 2 including a fillet layer of sealant and a first flaring layer of sealant.

FIG. 4 depicts the application of a first flaring layer 34 in such a way that the first flaring layer 34 contacts both the first work piece 24 and the fillet layer 32. Furthermore, first flaring layer 34 includes a flared edge 36 that minimizes fluid resistance. A flared edge on a layer or bead of sealant may be formed by lowering the nozzle tip as sealant is extruded, as discussed above. In one illustrative embodiment, where the nozzle inner diameter is about 3.00 mm to about 3.6 mm, the flaring layer may be applied with the nozzle tip lowered to 0.5 mm. Alternatively, or in addition, the nozzle tip may be used to spread the previously dispensed sealant by lowering the nozzle tip and moving the tip slightly further from the second work piece. This spreading may be accomplished while sealant is dispensed, at a lower rate of sealant flow, or after halting the flow of sealant completely. As a result of, or in combination with, the flaring of the first flaring layer 34, the height of the first flaring layer may be less than the height of the fillet layer 32, as shown in FIGS. 4-7.

Figure 5:
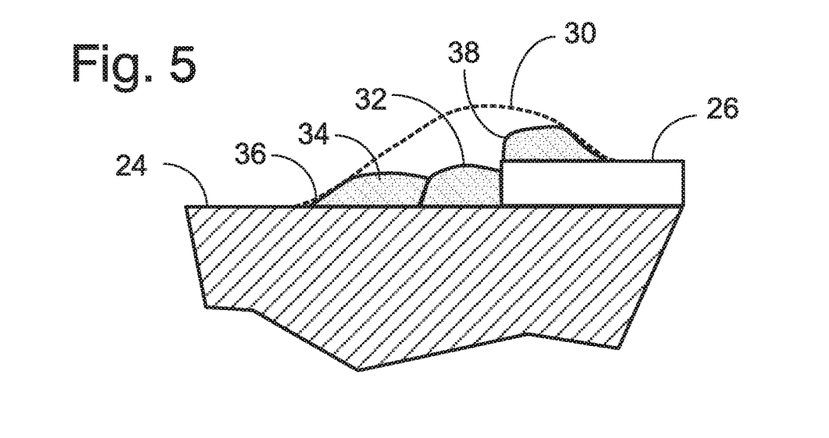
FIG. 5 is a diagrammatic representation of a cross-sectional view of the work pieces of FIG. 2 including a fillet layer of sealant, a first flaring layer of sealant, and a second flaring layer of sealant.

FIG. 5 depicts the application of a second flaring layer 38 of sealant in such a way that the second flaring layer 38 contacts the second work piece 26. The second flaring layer may be created by lowering the nozzle tip during dispensing and/or altering sealant flow from the nozzle tip, as discussed above. Where possible, the second flaring layer of sealant may optionally contact the fillet layer 32.

Figure 6:
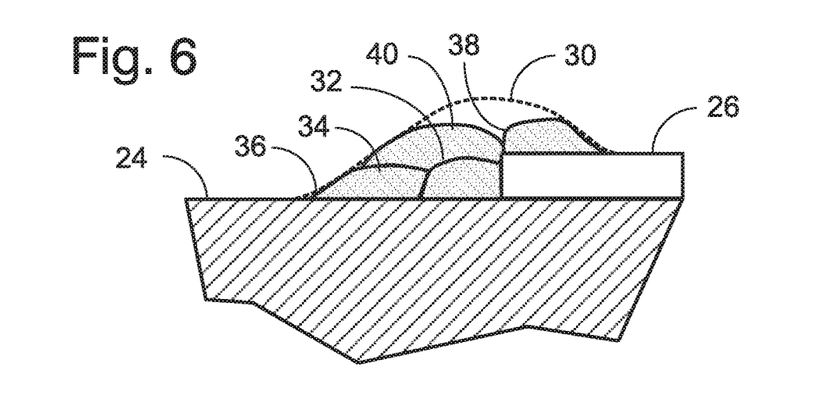
FIG. 6 is a diagrammatic representation of a cross-sectional view of the work pieces of FIG. 2 including a fillet layer of sealant, a first flaring layer of sealant, a second flaring layer of sealant, and a filler layer of sealant.

FIG. 6 depicts the application of a filling layer 40. One or more filling layers may be dispensed in order to create a substantially smooth sealant profile from the first flaring layer 34 to the second flaring layer 38, for example a seal having a profile that substantially matches the desired sealant profile 30. Any given filling layer may contact the fillet layer 32, the first flaring layer 34, the second flaring layer 38, or previously applied filling layers, as needed to substantially match the desired sealant profile 30. As shown in FIG. 6, filling layer 40 contacts the first flaring layer 34 and fillet layer 32, as well as second flaring layer 38, while FIG. 7 shows a filling layer 42 that contacts the previously applied filling layer 40 and second flaring layer 38, and brings the dispensed sealant profile into substantial agreement with desired sealant profile 30.

Figure 7:
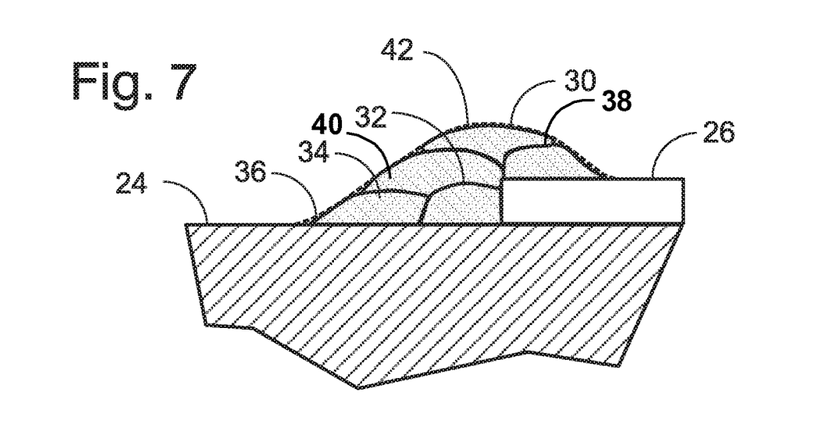
FIG. 7 is a diagrammatic representation of a cross-sectional view of the work pieces of FIG. 2 including a fillet layer of sealant, a first flaring layer of sealant, a second flaring layer of sealant, and two filler layers of sealant.

As shown in FIG. 7, the applied sealant forms a smooth sealant profile that will decrease resistance to fluid flow over the seal. That is, the sealant has been applied so as to create an outer sealant surface with a minimum of discontinuities, voids, and/or surface irregularities that would otherwise increase resistance to fluid flow over the sealant profile. The profile of the sealant may be composed of a plurality of smoothly curved segments, where the curved segments themselves are joined by curved transitions, that is the profile of the sealant includes few or no discontinuities or inflection points.

The creation of a smooth sealant profile has the result that turbulence in a fluid moving over the profile will be minimized. Where the fluid is flowing air, the substantially smooth profile may result in decreased air resistance. Where the fluid is a flowing liquid, the substantially smooth profile may result in decreased turbulence in the moving liquid (i.e. 'sloshing'). By decreasing resistance to moving fluid, the operational lifetime of the seal may be extended.

The ability to attain the desired sealant profile, as well as the quality and performance of the resulting seal, may be dependent upon a number of factors, including horizontal distance between adjacent sealant layers, vertical distance between adjacent sealant layers, sealant flow rate, sealant bead size, dispensing nozzle size, nozzle height, and the relative movement rate of the nozzle tip with respect to the work piece.

In particular, one or more of these factors may be manipulated so the dispensed sealant expands outwardly along a surface in a direction normal to the direction that the sealant exits the nozzle. This spreading, or flaring, can be advantageous when applying sealant into a corner or edge, such as the seam between work pieces. Alternatively, or in addition, the use of flaring when applying sealant adjacent to an existing sealant layer may force the sealant into crevices formed in the previously applied sealant layer, helping to prevent the formation of voids in the dispensed sealant.

The amount or intensity of flaring may depend on the height of the nozzle tip relative to the surface of the first work piece, the surface of the second work piece, and/or the surface of a previously dispensed layer of sealant. For example, by lowering the nozzle tip closer to the surface of the work piece, a relatively greater degree of flaring may be created, aiding the injection of sealant into seams and voids. In one illustrative embodiment of the disclosure, where the nozzle tip has an inner diameter of about 3.00 mm to about 3.6 mm, the nozzle tip may be disposed about 1.0 mm above the surface of the work piece when dispensing sealant. The dispensing nozzle may be maintained substantially perpendicular to the surface of the first work piece.

Selected nozzle attributes may also be adjusted to create a desired sealant profile, such as nozzle tip inner diameter, nozzle tip outer diameter, and nozzle tip wall thickness. For example, increasing the inner diameter of the sealant nozzle may increase the flow rate of the sealant, and help to urge the sealant into seams and voids. In one illustrative embodiment of the disclosure, the inner diameter of the sealant nozzle is between about 3.00 and about 3.6 mm. The outer diameter of the nozzle tip may also be varied in order to vary the resulting wall thickness of the dispensed sealant. Similarly, an increase in the nozzle wall thickness may increase the gap between the center of the nozzle end and the surface of the second work piece, and thereby require increasing flaring in order to achieve good contact between the sealant and the vertical surface. Good flaring from the nozzle, extruded sealant force, and force from the adjacent vertical surface may all be used to prevent voids and gaps in the resulting dispensed sealant.

The smoothness of the sealant profile may also be increased by reducing the size of the sealant bead being applied. That is, by depositing sealant in a finer bead, while the number of layers that must be applied increases, the thickness of the layers themselves decreases, resulting in a smoother profile.

Alternatively, or in addition, the flow rate of the sealant as it is dispensed from the nozzle tip may be modified by varying one or more of sealant viscosity, sealant temperature, and nozzle inner diameter. A sealant having lower viscosity typically exhibits an increased flow rate, as does a sealant at a higher temperature. However at higher temperatures, for example above 85° C., the sealant may be prone to sagging, although different sealant compositions may exhibit different thermal properties. A larger nozzle inner diameter also contributes to increased sealant flow rate. In one illustrative embodiment of the disclosure, a flow rate of about 0.35 g/s is preferred.

The flow of sealant may be continuous during the application of multiple layers. Alternatively, the flow of sealant may be discontinued after each layer of sealant is applied. In one illustrative embodiment of the disclosure, the nozzle tip is moving when the flow of sealant is started or stopped, which helps to avoid a buildup of sealant that might occur if the nozzle was stationary. In particular, a smooth final surface may be obtained by discontinuing the flow of sealant while still moving the nozzle, and then gradually raising the nozzle from the sealant. The nozzle tip may additionally be moved in an oval motion or in a zigzag pattern as it is raised.

It should be appreciated that, while the present disclosure refers to the movement of the dispensing nozzle with respect to a stationary work piece, the same sealant layering may be obtained by holding the dispensing nozzle stationary and moving the work piece relative to the nozzle.

Example 2

Figure 8:
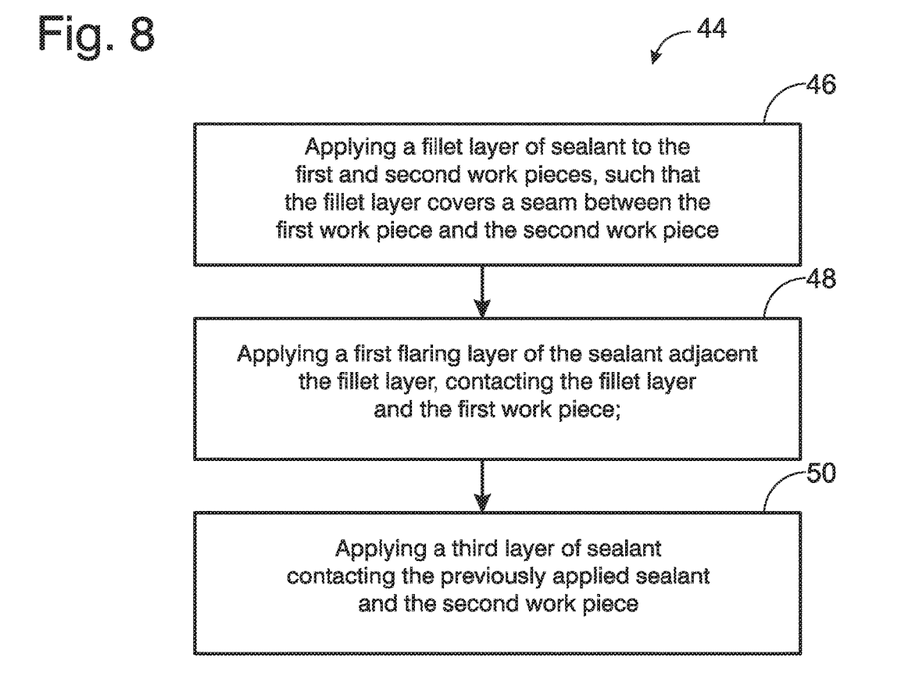
FIG. 8 is a flowchart depicting an alternative illustrative method of applying sealant to first and second work pieces.

An alternative illustrative method of applying sealant to a second work piece disposed on a first work piece is depicted by flowchart 44 of FIG. 8. The illustrative method includes applying a fillet layer of sealant to the first and second work pieces, such that the fillet layer covers a seam between the first work piece and the second work piece (at 46 of flowchart 44); applying a first flaring layer of sealant adjacent the fillet layer, contacting the fillet layer and the first work piece (at 48 of flowchart 44); and applying a third layer of sealant contacting the previously applied sealant and the second work piece (at 50 of flowchart 44).

As discussed above, the respective layers of sealant may be applied in any order, and may be applied individually or applied in a continuous process without stopping the flow of sealant or lifting the nozzle, or some combination thereof. The disclosed method may be used to seal seams that are linear, that comprise linear segments, curvilinear, or any combination thereof. In one aspect, all sealant layers are applied in a continuous process.

Figure 9:
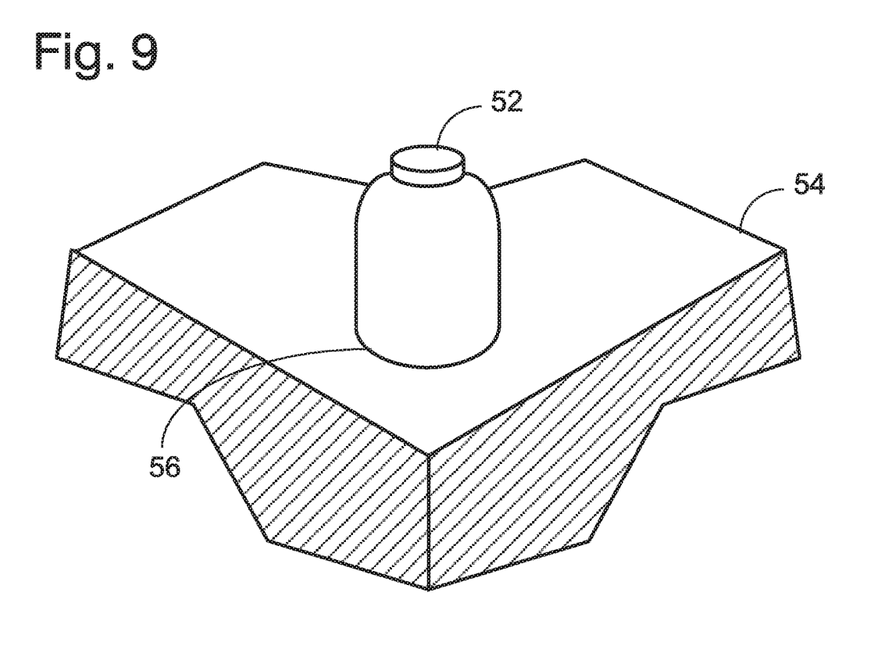
FIG. 9 is a diagrammatic representation of an isometric view of a first work piece and a second work piece that is a fastener on the first work piece.
Figure 10:
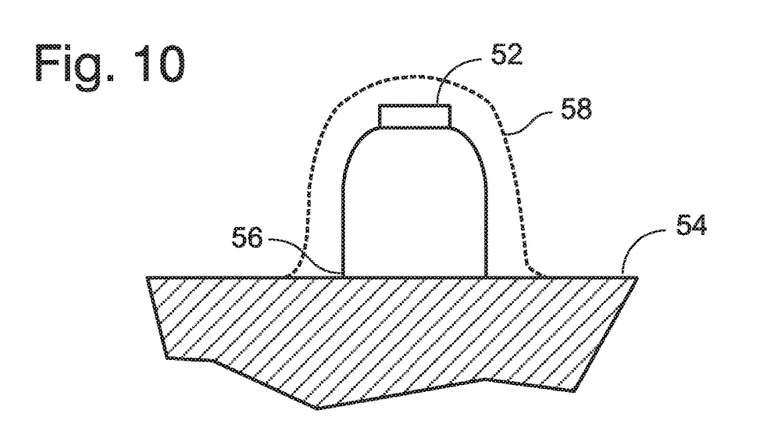
FIG. 10 is a diagrammatic representation of a cross-sectional view of the first work piece and fastener of FIG. 9, including a desired sealant profile.

For example, as shown in FIG. 9, the second work piece 52 may be a projecting head of a fastener on or in the first work piece 54, defining a seam 56 where fastener 52 and the first work piece 54 meet. A cross-section view of the fastener 52 and first work piece 54 of FIG. 9 is shown in FIG. 10, including profile 58 corresponding to a calculated or desired sealant profile that possesses minimal discontinuities, lips, or edges that may disrupt fluid flowing over the surface of the sealant.

Figure 11:
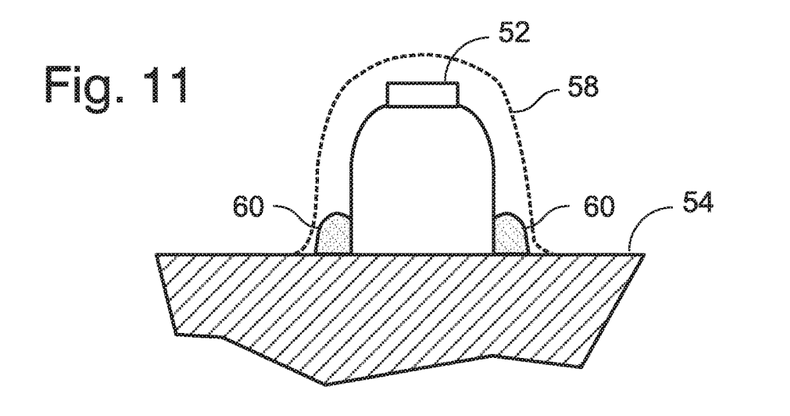
FIG. 11 is a diagrammatic representation of a cross-sectional view of the fastener and first work piece of FIG. 9, including a fillet layer of sealant.

FIG. 11 depicts a fillet layer 60 of sealant applied along the seam 56 between the first work piece 54 and fastener 52, so that the fillet layer completely covers seam 56.

Figure 12:
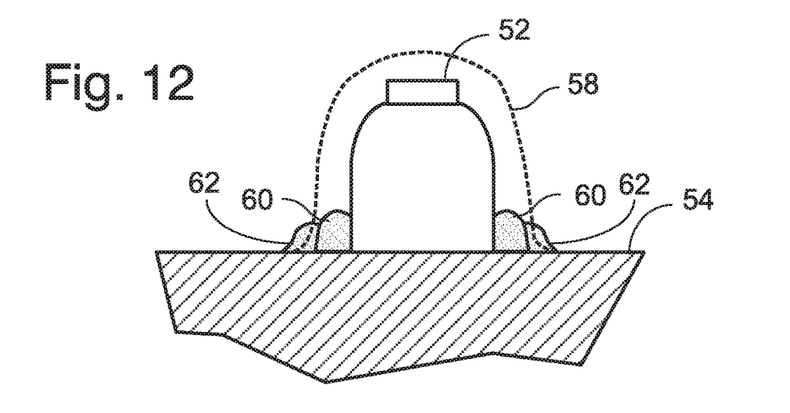
FIG. 12 is a diagrammatic representation of a cross-sectional view of the fastener and first work pieces of FIG. 9 including a fillet layer of sealant and a first flaring layer of sealant.

FIG. 12 depicts a first flaring layer 62 applied around the circumference of fastener 52, so that the first flaring layer contacts both the fillet layer 60 and the first work piece 54. The first flaring layer 62 may be applied by moving the sealant dispenser nozzle tip further from the fastener 52 head and/or lowering the tip closer to the first work piece 54 while dispensing additional sealant. Alternatively, or in addition, the nozzle tip may be used to form first flaring layer 62 by spreading the previously dispensed sealant of fillet layer 60, i.e. by lowering the nozzle tip and moving the tip slightly further from the second work piece 52. This spreading may be accomplished while sealant is dispensed, at a lower rate of sealant flow, or after halting the flow of sealant completely. As yet another alternative, the fillet layer 60 and the first flaring layer 62 may be formed in a continuous process as the nozzle tip dispenses sealant and orbits fastener 52. In each case, the first flaring layer 62 may be formed so that it contacts both the fillet layer 60 and the first work piece 54.

Figure 13:
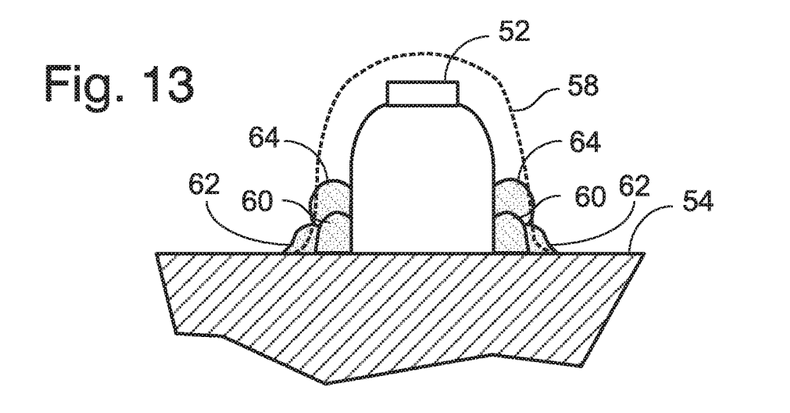
FIG. 13 is a diagrammatic representation of a cross-sectional view of the fastener and first work piece of FIG. 9 including a fillet layer of sealant, a first flaring layer of sealant, and a filler layer of sealant.

After the first flaring layer 62 is formed, a first filling layer 64 of sealant may be applied. Where the first flaring layer 62 extends sufficiently far from the fastener that first filling layer 64 cannot simultaneously contact the flaring layer and the fastener 52, the first filling layer of sealant may be applied so that it contacts both the fillet layer and the first flaring layer. As shown in FIG. 13, the first filling layer may be applied to that the filling layer contacts the previously applied fillet layer, the first flaring layer, and the fastener 52. Second and subsequent filling layers 64 of sealant may be applied so that they contact one or more previously applied filling layers and the second work piece.

Figure 14:
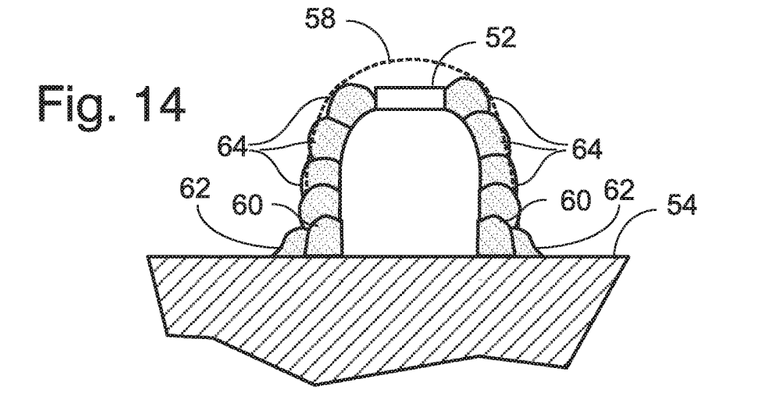
FIG. 14 is a diagrammatic representation of a cross-sectional view of the fastener and first work piece of FIG. 9, including a fillet layer of sealant, a first flaring layer of sealant, and a plurality of filler layers of sealant.

The filling layers of sealant may be applied discretely, or may be applied as part of a continuous sealant application. For example, as shown in FIG. 14, the filling layer 64 may be applied by continuously applying sealant in a wrapping motion of the nozzle around the fastener 52, while raising the nozzle tip to accommodate the increasing height of the filling layer 64, effectively sheathing the sides of fastener 52. Alternatively, each circular application of sealant may be applied discretely as a plurality of filler layers, as discussed above.

Figure 15:
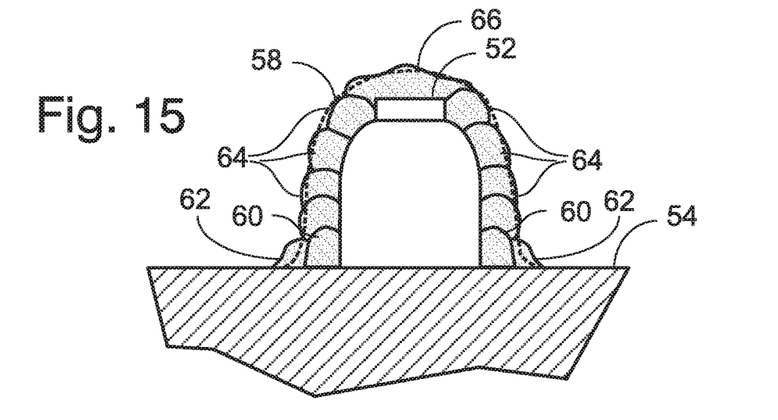
FIG. 15 is a diagrammatic representation of a cross-sectional view of the fastener and first work piece of FIG. 9, including a fillet layer of sealant, a first flaring layer of sealant, a plurality of filler layers of sealant, and a circular sealant cap.

As shown in FIG. 15, additional sealant may be applied to fastener 52 so as to form a sealant cap 66. The sealant cap 66 may be applied so that the applied sealant forms a substantially smooth surface that will decrease resistance to fluid flow over the fastener head. To help create a smooth sealant cap 66, it may be advantageous to complete the sealant cap 66 by discontinuing sealant flow to the dispenser nozzle while continuing to move the nozzle in a circular motion and gradually raising the nozzle tip. The sealant cap 66 may alternatively be finished by raising the nozzle tip while moving the tip in an oval shape or zigzag motion to smoothly terminate cap formation. Also as shown in FIG. 15, the applied sealant may form a substantially smooth profile that additionally defines the desired sealant profile.

In one embodiment of the disclosure, the fastener 52 may be covered by dispensed sealant in a continuous process. That is, a continuous bead of sealant is dispensed, with the nozzle tip moving in such a way as to define the fillet layer 60, first flaring layer 62, first filling layer 64, and sealant cap 66 before discontinuing flow of sealant. For any means of application, consecutive sealant layers should be dispensed so that they are not so far apart that voids and ridged layers are created, nor should the layers be dispensed so closely spaced that the sealant is applied too thickly, which may result in distortion of the sealant by gravity before the sealant can cure properly.

Example 3

Figure 16:
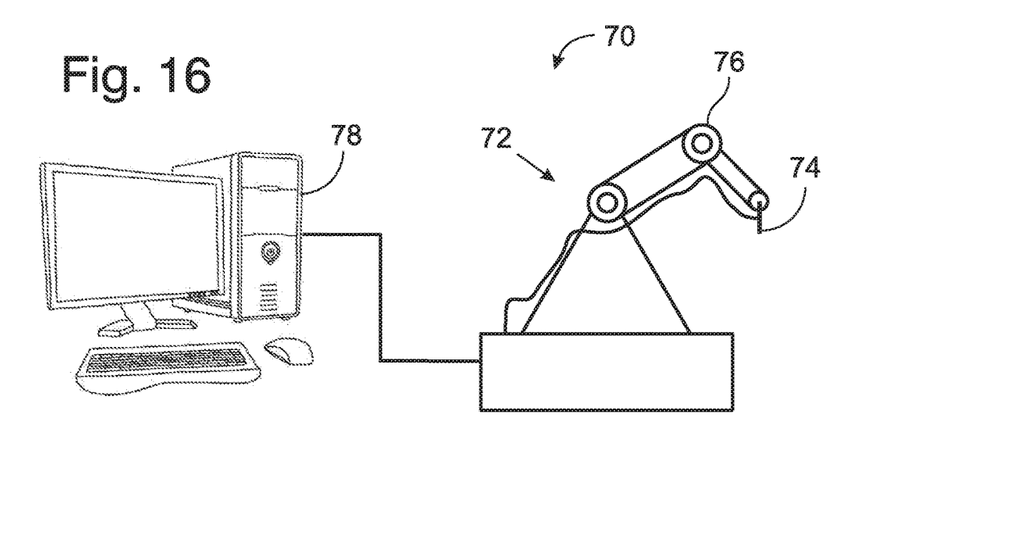
FIG. 16 is a diagrammatic representation of a system configured to carry out an automated method of applying a sealant according to the present disclosure.

This example describes an illustrative system 70 for applying a sealant composition according to one embodiment of the present disclosure. As shown in FIG. 16, system 70 may include a robotic assembly 72 that itself includes a nozzle 74 configured to apply a desired sealant composition. The robotic assembly 72 may be capable of controlling the movement of the nozzle with multiple degrees of freedom. The robotic assembly may be capable of translating the nozzle along each of three perpendicular axes, and may additionally be capable of rotation of the nozzle around up to three perpendicular axes, creating six degrees of freedom of movement. The robotic assembly may include a robotic arm 76. The robotic arm 76 may be a multipurpose arm assembly for use in general manufacturing techniques, or the robotic arm may be specifically constructed for sealant application. When the nozzle 74 is present on a robotic arm 76, it may disposed at or near the distal end of the robotic arm 76.

System 70 may further include a computer or processor 78 that may be programmed to control the operation of the robotic assembly 72, and specifically may be programmed to control the operation of the robotic assembly 72 to apply a sealant composition in multiple layers, as discussed above. A variety of general-purpose robotic assemblies are commercially available, and may be readily adapted and/or programmed to apply a desired sealant composition according to the methods of the present disclosure.

Processor 78 may include software corresponding to a user interface, where the user interface permits a operator to program the robotic assembly 72 to execute the desired sequence of movements necessary to apply a sealant composition as described in the present disclosure. The user interface may accept inputs such as the dimensions of the first and second work pieces, the desired smooth sealant profile, the viscosity of the sealant to be used, the inner diameter of the dispenser nozzle, and the outer diameter of the dispenser nozzle, among others. The user interface may be configured so that the parameters for the deposition of each layer of sealant is specified by the operator. Alternatively, the user interface may permit an operator to simply input the desired smooth sealant profile as an input, and the user interface then creates an appropriate sealant dispensing pattern to substantially match desired sealant profile on a specified work piece.

Various aspects of the user interface, as well as the operating software to control the robotic assembly, may be embodied as a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects, all of which may generally be referred to herein as a "module," or "system." Furthermore, aspects of the present disclosure may take the form of a computer program product embodied in a computer-readable medium (or media) having computer readable program code/instructions embodied thereon.

Instructions for an operating system, applications, and/or programs may be located in one or more storage devices in communication with the one or more processor units through the communications framework. The instructions may be in a functional form on a persistent storage. These instructions may be loaded into a memory for execution by the processor 78.

These instructions may be referred to as program instructions, program code, computer usable program code, or computer readable program code that may be read and executed by processor 78. The program code in the different embodiments may be embodied on different physical or computer-readable media.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present disclosure may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

The computer program code or instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the present disclosure. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Example 4

This section describes additional aspects and features of the systems and methods of applying layered sealant, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method of applying a sealant to a seam between a first work piece and a second work piece that abuts the first work piece, comprising:

identifying a desired smooth sealant profile for sealing the seam;

selecting a sealant layering sequence that is configured to produce the desired smooth sealant profile;

applying a fillet layer of the sealant to the first and second work pieces, such that the fillet layer covers the seam;

applying a first flaring layer of the sealant adjacent the fillet layer, such that the first flaring layer contacts the fillet layer and the first work piece;

applying a second flaring layer of the sealant, such that the second flaring layer contacts the second work piece; and applying one or more filling layers of the sealant so as to substantially define the desired smooth sealant profile, wherein the one or more filling layers in combination contact each of the first flaring layer, the fillet layer, and the second flaring layer.

A1. The method of paragraph A0, wherein applying the one or more filling layers of the sealant creates a substantially smooth sealant profile from the first flaring layer to the second flaring layer.

A2. The method of paragraph A0, wherein the second flaring layer of the sealant is applied prior to a final filling layer of the sealant.

A3. The method of paragraph A0, wherein each layer of the sealant is applied robotically.

A4. The method of paragraph A0, including applying a plurality of filling layers of the sealant.

A5. The method of paragraph A0, wherein applying the first flaring layer includes applying a first flaring layer that has a height less than a height of the fillet layer.

A6. The method of paragraph A0, further including applying a fillet layer of the sealant to the seam where the first and second work pieces meet, wherein the first and second work pieces meet at an angle of from about 90 degrees to about 180 degrees.

A7. The method of paragraph A0, further including applying a fillet layer of the sealant to the seam where the first and second work pieces meet, wherein the first and second work pieces meet at an angle that is less than about 90 degrees.

A8. The method of paragraph A0, further including applying a fillet layer of the sealant to the seam where the first and second work pieces meet, wherein the first and second work pieces meet at an angle that is about 90 degrees.

A9. The method of paragraph A0, wherein each layer of the sealant is applied robotically and the first and second work pieces remain stationary.

A10. The method of paragraph A9, wherein the sealant is applied via a nozzle that moves relative to the first and second work pieces.

A11. The method of paragraph A0, wherein each layer of the sealant is applied robotically via a nozzle, while the work pieces move relative to the nozzle.

A12. The method of paragraph A0, wherein a cross-sectional volume of each of the one or more filling layers of the sealant is overlapping at least a portion of a volume of a previously applied layer of the sealant.

B0. A method of applying a sealant to a seam between a second work piece disposed on a first work piece, the method comprising:

applying a fillet layer of the sealant to the first and second work pieces, such that the fillet layer covers the seam between the first work piece and the second work piece;

applying a first flaring layer of the sealant adjacent the fillet layer contacting the fillet layer and the first work piece; and applying a first filling layer of the sealant contacting the first flaring layer and the fillet layer.

B1. The method of claim B0, wherein applying the first filling layer includes contacting the first flaring layer, the fillet layer, and the second work piece.

B2. The method of paragraph B0, further comprising applying a second filling layer of the sealant contacting the first filling layer and the second work piece.

B3. The method of paragraph B0, wherein the fillet layer, the first flaring layer, and the first filing layer of the sealant are applied in a continuous process.

B4. The method of paragraph B0, wherein the second work piece is a portion of a fastener, the method further comprising applying a plurality of successive additional layers of the sealant by continuously wrapping upward around the second work piece.

B5. The method of paragraph B4, wherein the continuous process includes applying a sealant cap to a top of the fastener.

B6. The method of paragraph B3, further comprising;

applying a plurality of successive additional layers of the sealant by continuously wrapping upward around the second work piece.

B7. The method of paragraph B0, further comprising:

applying a first filling layer of sealant, contacting the fillet layer and the first flaring layer.

C0. An automated method of applying a sealant around a circular fastener disposed in a first work piece, comprising:

applying a fillet layer of the sealant to the fastener and the first work piece, such that the fillet layer covers a seam between the fastener and the first work piece;

applying a first flaring layer of sealant adjacent the fillet layer, contacting the fillet layer and the first work piece;

continuously applying successive additional layers of sealant wrapping upward around the circular fastener; and applying a sealant cap to a top of the circular fastener.

C1. The method of paragraph C0, wherein creating the sealant cap includes continuing the circular motion of the sealant nozzle while raising the sealant nozzle and without dispensing additional sealant.

C2. The method of paragraph C0, wherein the sealant is applied robotically.

D0. A system for applying a sealant to a first work piece and a second work piece, comprising,
a robotic assembly including a nozzle configured to apply the sealant to a seam formed between the first and the second work pieces; and
a computer connected to the robotic assembly and programmed to control operation of the robotic assembly to deliver sequentially through the nozzle: (a) a fillet layer of the sealant covering the seam between the first work piece and the second work piece, (b) a first flaring layer of the sealant contacting the first work piece and the fillet layer, and (c) a third layer of the sealant contacting a previously applied layer of the sealant and the second work piece.

D1. The system of paragraph D0, wherein the robotic assembly is configured to apply the sealant via the nozzle while the first and the second work pieces remain stationary.

D2. The system of paragraph D0, wherein the second work piece is a fastener, and the third layer of sealant substantially covers a head of the fastener.

E0. A method of applying sealant to a first work piece disposed on a second work piece, the method comprising:
determining a sealant fill profile to cover a seam between the first work piece and the second work piece;
sequentially applying multiple layers of sealant until the determined sealant profile is substantially filled with sealant.

E1. The method of paragraph E0, wherein the step of sequentially applying multiple layers of sealant includes applying a fillet layer that covers the seam between the first work piece and the second work piece.

E2. The method of paragraph E0, wherein the step of sequentially applying multiple layers of sealant includes applying a flaring layer contacting the first work piece and the fillet layer.

E3. The method of paragraph E0, wherein the step of sequentially applying multiple layers of sealant includes applying a flaring layer contacting the first work piece and the fillet layer.

Advantages, Features, Benefits

The different embodiments of the systems and methods for sealant layering as described herein provide several advantages over known methods for sealant application during manufacturing. The resulting sealed seams minimize the turbulence that may be created in fluids passing over the seams, and permit satisfactory sealed seams to be created using a minimal amount of sealant, thereby reducing overall weight.

While not all embodiments described herein may provide the same advantages or the same degree of advantage, the systems and methods described herein may have particularly utility in the aerospace industry, particularly in aircraft manufacture. Exemplary areas where the sealed seams of the present disclosure may be particularly advantageous include the inside or outside surfaces of wingboxes, on wing surfaces, on spar surfaces, along stringer stiffeners, and on or over fasteners, among others.

CONCLUSION

The disclosure set forth above may encompass multiple distinct disclosures with independent utility. Although each of these disclosures has been disclosed in its preferred form(s), the specific embodiments thereof as disclosed and illustrated herein are not to be considered in a limiting sense, because numerous variations are possible. The subject matter of the disclosures includes all novel and nonobvious combinations and subcombinations of the various elements, features, functions, and/or properties disclosed herein. The following claims particularly point out certain combinations and subcombinations regarded as novel and nonobvious. Disclosures embodied in other combinations and subcombinations of features, functions, elements, and/or properties may be claimed in applications claiming priority from this or a related application. Such claims, whether directed to a different disclosure or to the same disclosure, and whether broader, narrower, equal, or different in scope to the original claims, also are regarded as included within the subject matter of the inventions of the present disclosure.

What is claimed is:

1. A method of applying a sealant to a seam between a first work piece and a second work piece that abuts the first work piece, comprising:
identifying a desired smooth sealant profile for sealing the seam;
selecting a sealant layering sequence that is configured to produce the desired smooth sealant profile;
applying a fillet layer of the sealant to the seam where the first and second work pieces meet, such that the fillet layer covers the seam;
applying a first flaring layer of the sealant adjacent the fillet layer, such that the first flaring layer contacts the fillet layer and the first work piece;
applying a second flaring layer of the sealant, such that the second flaring layer contacts the second work piece; and
applying one or more filling layers of the sealant so as to substantially define the desired smooth sealant profile, wherein the one or more filling layers in combination contact each of the first flaring layer, the fillet layer, and the second flaring layer.

2. The method of claim 1, wherein applying the one or more filling layers of the sealant creates a substantially smooth sealant profile from the first flaring layer to the second flaring layer.

3. The method of claim 1, wherein the second flaring layer of the sealant is applied prior to a final filling layer of the sealant.

4. The method of claim 1, wherein each layer of the sealant is applied robotically.

5. The method of claim 1, including applying a plurality of filling layers of the sealant.

6. The method of claim 1, wherein applying the first flaring layer includes applying a first flaring layer that has a height less than a height of the fillet layer.

7. The method of claim 1, wherein applying the fillet layer of the sealant to the seam where the first and second work pieces meet includes applying the fillet layer of the sealant to the seam wherein the first and second work pieces meet at an angle of from about 90 degrees to about 180 degrees.

8. The method of claim 1, wherein applying the fillet layer of the sealant to the seam where the first and second work pieces meet includes applying the fillet layer of the sealant to the seam wherein the first and second work pieces meet at an angle that is less than about 90 degrees.

9. The method of claim 1, wherein each layer of the sealant is applied robotically and the first and second work pieces remain stationary.

10. The method of claim 9, wherein the sealant is applied via a nozzle that moves relative to the first and second work pieces.

11. The method of claim 1, wherein a cross-sectional volume of each of the one or more filling layers of the sealant is overlapping at least a portion of a volume of a previously applied layer of the sealant.

12. A method of applying a sealant to a seam between a second work piece disposed on a first work piece, the method comprising:
   applying a fillet layer of the sealant to the first and second work pieces, such that the fillet layer covers the seam between the first work piece and the second work piece;
   applying a first flaring layer of the sealant adjacent the fillet layer contacting the fillet layer and the first work piece;
   applying a first filling layer of the sealant contacting the first flaring layer and the fillet layer; and
   applying a second filling layer of the sealant contacting the first filling layer and the second work piece.

13. The method of claim 12, wherein applying the first filling layer includes contacting the first flaring layer, the fillet layer, and the second work piece.

14. The method of claim 12, wherein the fillet layer, the first flaring layer, and the first filling layer of the sealant are applied in a continuous process.

15. The method of claim 14, wherein the second work piece is a portion of a fastener, the method further comprising applying a plurality of successive additional layers of the sealant by continuously wrapping upward around the second work piece.

16. The method of claim 15, wherein the continuous process includes applying a sealant cap to a top of the fastener.

* * * * *